US009958757B2

(12) United States Patent
Turk

(10) Patent No.: US 9,958,757 B2
(45) Date of Patent: *May 1, 2018

(54) RING LIGHT

(71) Applicant: Image-In, LLC, Bratenahl, OH (US)

(72) Inventor: John Anthony Turk, Bratenahl, OH (US)

(73) Assignee: IMAGE-IN, LLC, Bratenahl, OH (US)

( * ) Notice: Subject to any disclaimer, the term of this patent is extended or adjusted under 35 U.S.C. 154(b) by 32 days.

This patent is subject to a terminal disclaimer.

(21) Appl. No.: 14/827,380

(22) Filed: Aug. 17, 2015

(65) Prior Publication Data

US 2015/0355526 A1 Dec. 10, 2015

Related U.S. Application Data

(63) Continuation of application No. 13/910,155, filed on Jun. 5, 2013, now Pat. No. 9,268,199.

(51) Int. Cl.
| | |
|---|---|
| *F21V 21/005* | (2006.01) |
| *G03B 15/03* | (2006.01) |
| *F21V 21/14* | (2006.01) |
| *F21V 23/00* | (2015.01) |
| *G03B 15/02* | (2006.01) |
| *F21S 4/20* | (2016.01) |

(52) U.S. Cl.
CPC ........... *G03B 15/03* (2013.01); *F21S 4/20* (2016.01); *F21V 21/005* (2013.01); *F21V 21/14* (2013.01); *F21V 23/002* (2013.01); *G03B 15/02* (2013.01); *G03B 2215/0575* (2013.01)

(58) Field of Classification Search
CPC ...................................... G03B 15/03
USPC ............. 362/3, 184, 225, 227, 234, 249.01, 362/249.14, 249.16, 253, 565, 806
See application file for complete search history.

(56) References Cited

U.S. PATENT DOCUMENTS

| | | | |
|---|---|---|---|
| 5,057,981 A | 10/1991 | Bowen et al. | |
| 5,559,681 A | 9/1996 | Duarte | |
| 5,876,111 A * | 3/1999 | Wu ........................... | F21S 4/20 362/249.16 |
| 6,170,964 B1 | 1/2001 | Hsu | |
| 6,607,284 B1 * | 8/2003 | Tsai ........................ | F21S 4/003 362/121 |
| 2014/0362555 A1 * | 12/2014 | Turk ...................... | G03B 15/03 362/3 |

OTHER PUBLICATIONS

Ring lights for cameras—Bing images; http://www.bing.con/images/search?q=ring+lights+for+cameras&qpvt=ring+lights+. . . ; May 16, 2013.

(Continued)

*Primary Examiner* — Elmito Breval
*Assistant Examiner* — Meghan Ulanday
(74) *Attorney, Agent, or Firm* — Renner, Otto, Boisselle & Sklar, LLP

(57) ABSTRACT

This invention relates to a collapsible ring light assembly comprising: a first arcuate tubular member and a second arcuate tubular member. The arcuate tubular members can be attached to and detached from each other. Each arcuate tubular member includes a plurality of standard light sockets adapted for use with a wide variety of bulbs. The ring light assembly has a diameter of at least about 24 inches.

11 Claims, 6 Drawing Sheets

(56) References Cited

OTHER PUBLICATIONS

Amazon.com: ring light photography; http://www.Amazon.com; May 16, 2013.
Jonathan Z. Kremer; "Types of Light Bulbs and Their Uses"; Megavolt; May 28, 2013.
EHow; How to Use Ring Light in Photography; www.ehow.com/how_2215928_use-ring-light-photography.html; May 16, 2013.
Encyclopedia.com; Light Bulb; www.encyclopedia.com/topicl-Light_Bulb.aspx; May 28, 2013.

* cited by examiner

RING LIGHT

This application is a continuation under 35 U.S.C. § 120 of U.S. application Ser. No. 13/910,155. The disclosure in this prior application is incorporated herein by reference.

TECHNICAL FIELD

This invention relates to ring lights, and more particularly, to a collapsible ring light assembly.

BACKGROUND

Ring lights are used in photography to erase shadows from objects being photographed.

SUMMARY

This invention relates to a collapsible ring light assembly, comprising: a first arcuate tubular member and a second arcuate tubular member, the first arcuate tubular member being attachable to and detachable from the second arcuate tubular member; the first arcuate tubular member comprising a first arcuate tubular section and a second arcuate tubular section, the first arcuate tubular section having a first end and a second end, the second arcuate tubular section having a first end and a second end, a first hinge connected to the first end of the first arcuate tubular section and to the second end of the second arcuate tubular section to allow the first arcuate tubular section to pivot about the first hinge relative to the second arcuate tubular section; a plurality of first light sockets attached to the first arcuate tubular section and to the second arcuate tubular section, each first light socket being oriented in the same direction; and a first electric line extending through the first arcuate tubular section and the second arcuate tubular section, the first electric line being adapted to connecting the plurality of first light sockets to a power source; the second arcuate tubular member comprising a third arcuate tubular section and a fourth arcuate tubular section, the third arcuate tubular section having a first end and a second end, the fourth arcuate tubular section having a first end and a second end; a second hinge being connected to the first end of the fourth arcuate tubular section and to the second end of the third arcuate tubular section to allow the third arcuate tubular section to pivot about the second hinge relative to the fourth arcuate tubular section; a plurality of second light sockets attached to the third arcuate tubular section and to the fourth arcuate tubular section, each second light socket being oriented in the same direction; and a second electric line extending through the third arcuate tubular section and the fourth arcuate tubular section, the second electric line being adapted to connecting the plurality of second light fixtures attached to a power source; a first latch adapted to connect and disconnect the second end of the first arcuate tubular section to the first end of the third arcuate tubular section; a second latch adapted to connect and disconnect the first end of the second arcuate tubular section to the second end of the fourth arcuate tubular section; each of the first, second, third and fourth arcuate tubular sections having a radius of at least about 12 inches.

In an embodiment, each of the first, second, third and fourth arcuate tubular sections has a cross-section in the form of a circle, square, rectangle or polygon.

In an embodiment, each of the first, second, third and fourth arculate tubular sections has a cross-section in the form of a circle.

In an embodiment, the ring light assembly is in the form of a circle.

In an embodiment, the first and second arcuate tubular members can be detached from each other and folded to form eye-shaped rings.

In an embodiment, the ring light assembly is in the form of a circle and has a diameter in the range from about 24 to about 50 inches. The diameter may be in the range from about 32 to about 40 inches.

In an embodiment, each light socket comprises a screw-in socket. Each screw-in socket may have a base diameter in the range from about 5 to about 40 millimeters. Each screw-in socket may have a base diameter of about 27 millimeters.

In an embodiment, a bulb is inserted in each light socket. Each bulb may comprise an incandescent bulb, fluorescent bulb, halogen bulb, high pressure sodium bulb, metal halide bulb, mercury vapor bulb, low-pressure sodium bulb, or light emitting diode.

BRIEF DESCRIPTION OF THE DRAWINGS

In the annexed drawings like parts and features have like references. A number of the drawings are schematic illustrations which may not necessarily be drawn to scale.

DETAILED DESCRIPTION

Figure 1:
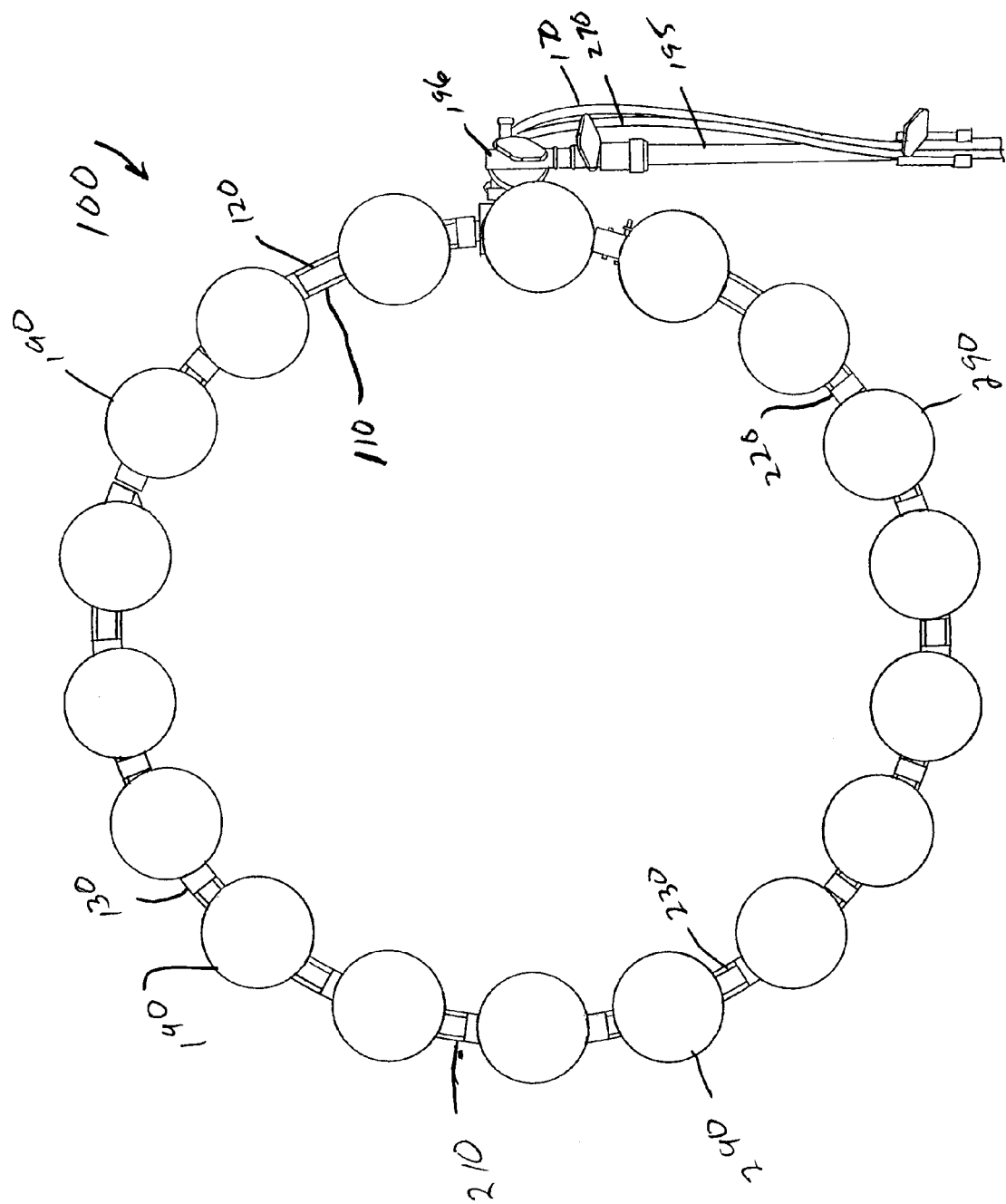
FIG. 1 is a schematic illustration of the inventive ring light assembly.
Figure 2:
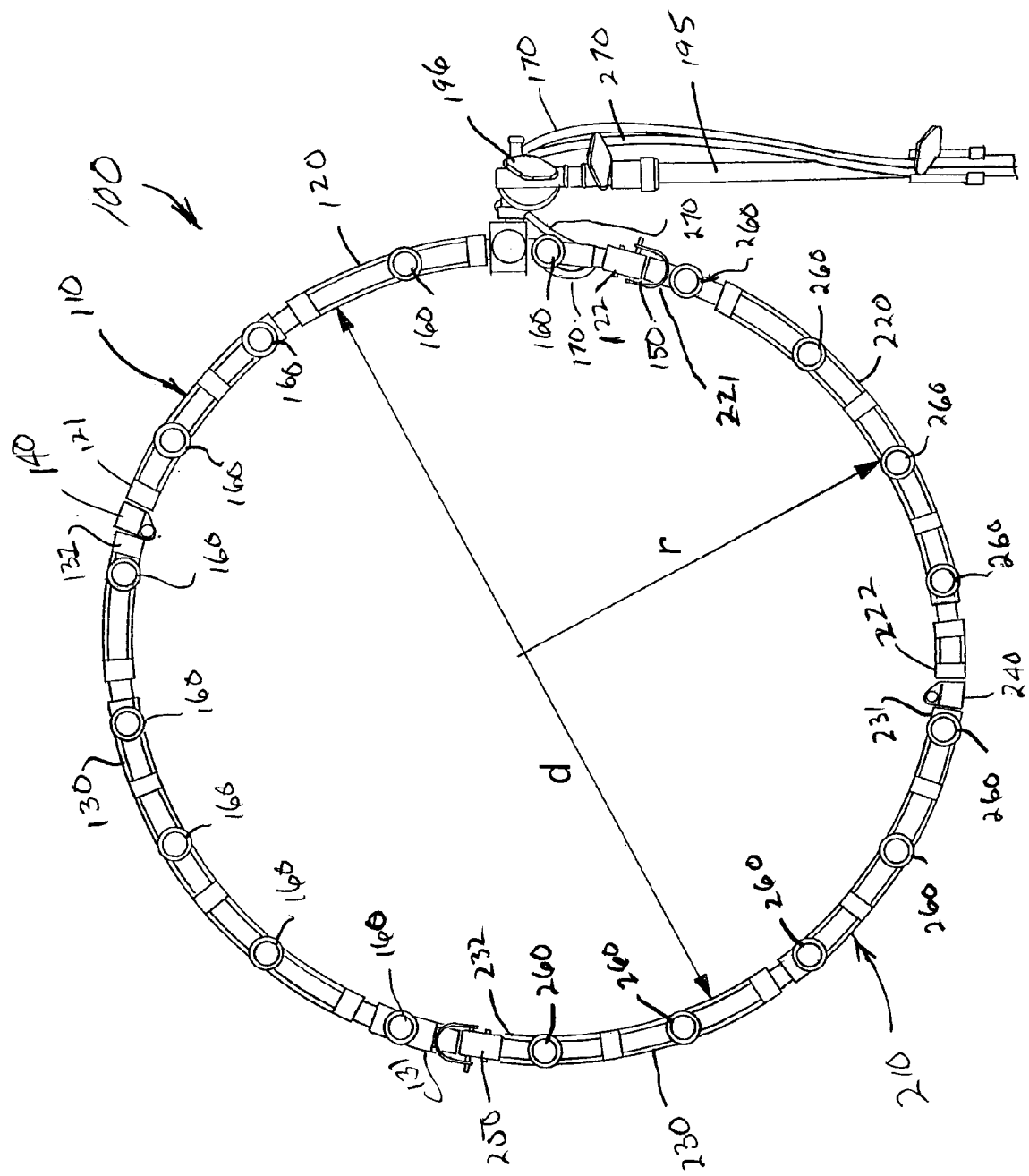
FIG. 2 is a schematic illustration of the ring light assembly illustrated in FIG. 1, with the bulbs removed for purposes of illustration.

All ranges and ratio limits disclosed in the specification and claims may be combined in any manner. It is to be understood that unless specifically stated otherwise, references to "a," "an," and/or "the" may include one or more than one, and that reference to an item in the singular may also include the item in the plural.

The phrase "and/or" should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

The word "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or may refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

The phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The transitional words or phrases, such as "comprising," "including," "carrying," "having," "containing," "involving," "holding," and the like, are to be understood to be open-ended, i.e., to mean including but not limited to.

Referring to the drawings, the collapsible ring light assembly 100 may comprise: a first arcuate tubular member 110 and a second arcuate tubular member 210. The arcuate tubular members 110 and 210 may be attached to each other to form the ring light assembly 100. The arcuate tubular members 110 and 210 may be detached from each other to facilitate storage and transport of the ring light assembly.

The first arcuate tubular member 110 may comprise a first arcuate tubular section 120 and a second arcuate tubular section 130. The first arcuate tubular section 120 may have a first end 121 and a second end 122. The second arcuate tubular section 130 may have a first end 131 and a second end 132. A first hinge 140 may be connected to the first end 121 of the first arcuate tubular section 120 and to the second end 132 of the second arcuate tubular section 130 to allow the first arcuate tubular section 120 to pivot about the first hinge 140 relative to the second arcuate tubular section 130. A plurality of first light sockets 160 may be attached to the first arcuate tubular section 120 and to the second arcuate tubular section 130. Each light socket 160 may be oriented in the same direction. A first electric line 170 may extend through the first arcuate tubular section 120 and the second arcuate tubular section 130 and connect the plurality of light sockets 160 to a power source. A bulb 190 may be inserted in each of the light sockets 160.

The second arcuate tubular member 210 may comprise a third arcuate tubular section 220 and a fourth arcuate tubular section 230. The third arcuate tubular section 230 may have a first end 221 and a second end 222. The fourth arcuate tubular section 230 may have a first end 231 and a second end 232. A second hinge 240 may be connected to the first end 231 of the fourth arcuate tubular section 230 and to the second end 222 of the third arcuate tubular section 220 to allow the third arcuate tubular section 220 to pivot about the second hinge 240 relative to the fourth arcuate tubular section 230. A plurality of second light sockets 260 may be attached to the third arcuate tubular section 220 and to the fourth arcuate tubular section 230. Each light socket 260 may be oriented in the same direction. A second electric line 270 may extend through the third arcuate tubular section 220 and the fourth arcuate tubular section 230 and connect the plurality of light sockets 260 to a power source. A bulb 290 may be inserted in each of the light sockets 260.

A first latch 150 may be adapted to connect and disconnect the second end 122 of the first arcuate tubular section 120 to the first end 221 of the third arcuate tubular section 220. A second latch 250 may be adapted to connect and disconnect the first end 131 of the second arcuate tubular section 130 to the second end 232 of the fourth arcuate tubular section 230.

The ring light assembly 100 may be mounted on support stand 195 using support bracket 196. Support stand 195 and support bracket 196 may be conventional in design.

Figure 3:
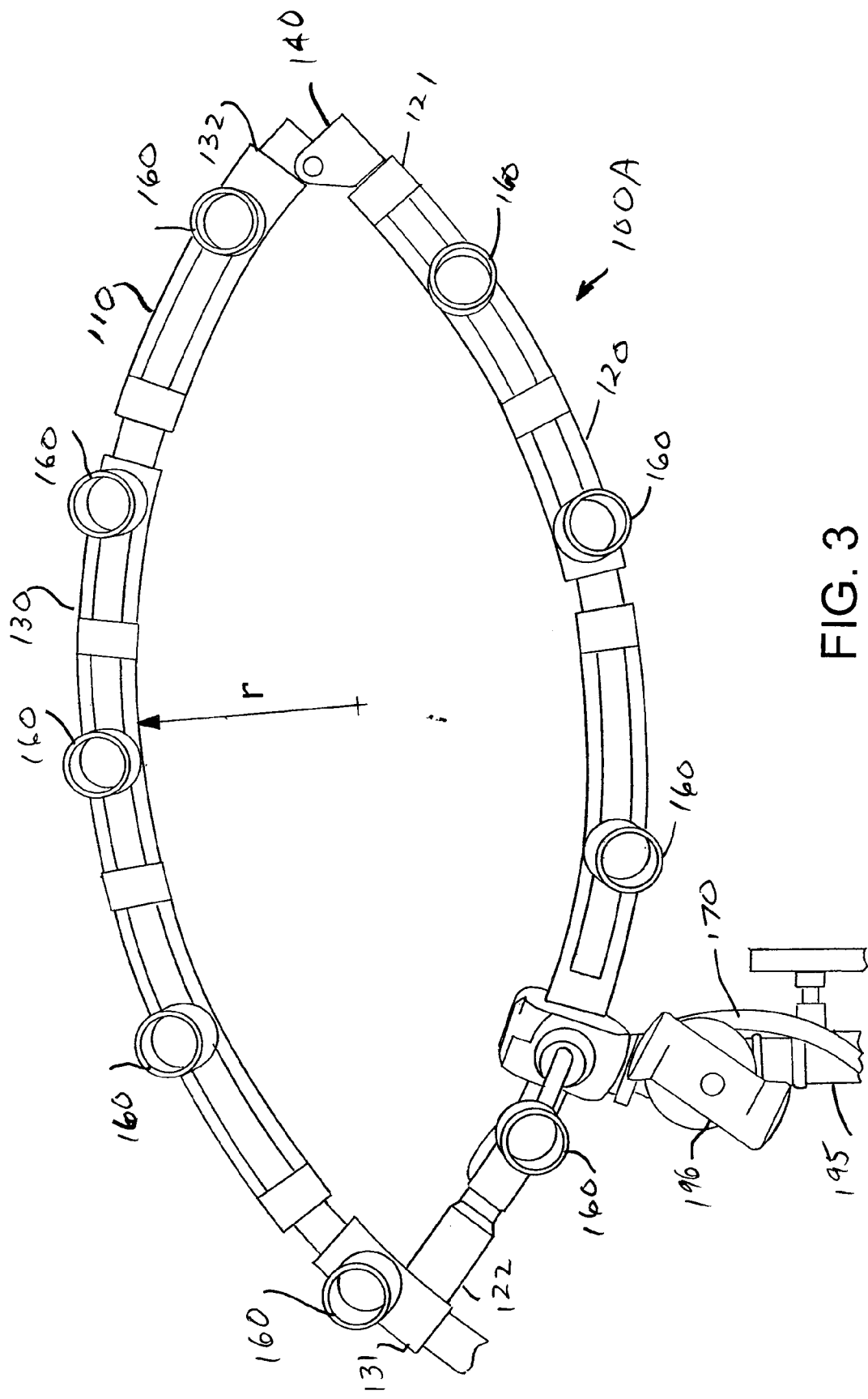
FIG. 3 is a schematic illustration of one of two arcuate tubular members taken from the light assembly illustrated in FIG. 1, with the arcuate tubular member being folded over on itself to facilitate storage and to form an eye-shaped light assembly.
Figure 4:
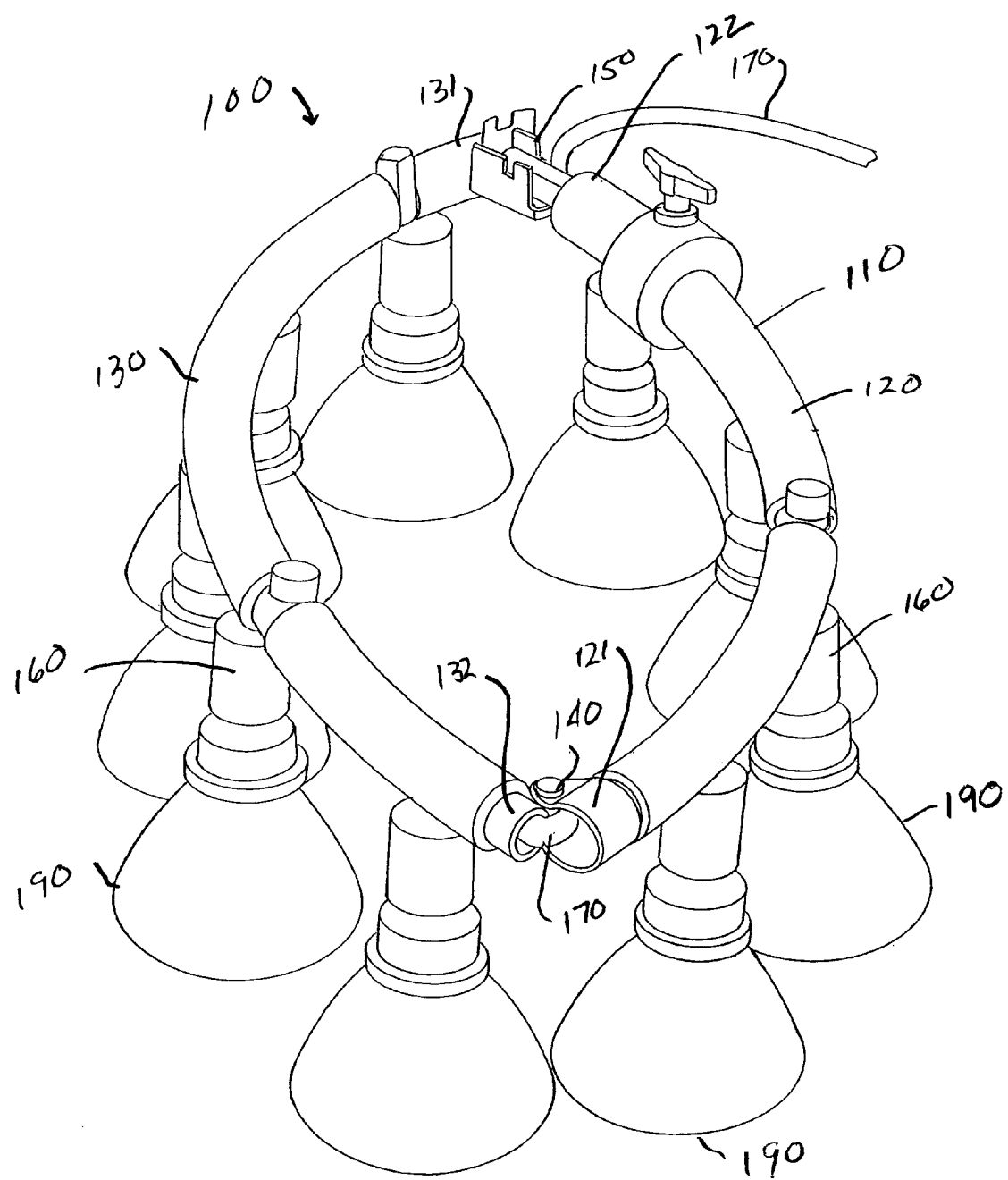
FIG. 4 is a schematic illustration of the eye-shaped light assembly illustrated in FIG. 3 with the bulbs inserted in the light sockets.
Figure 5:
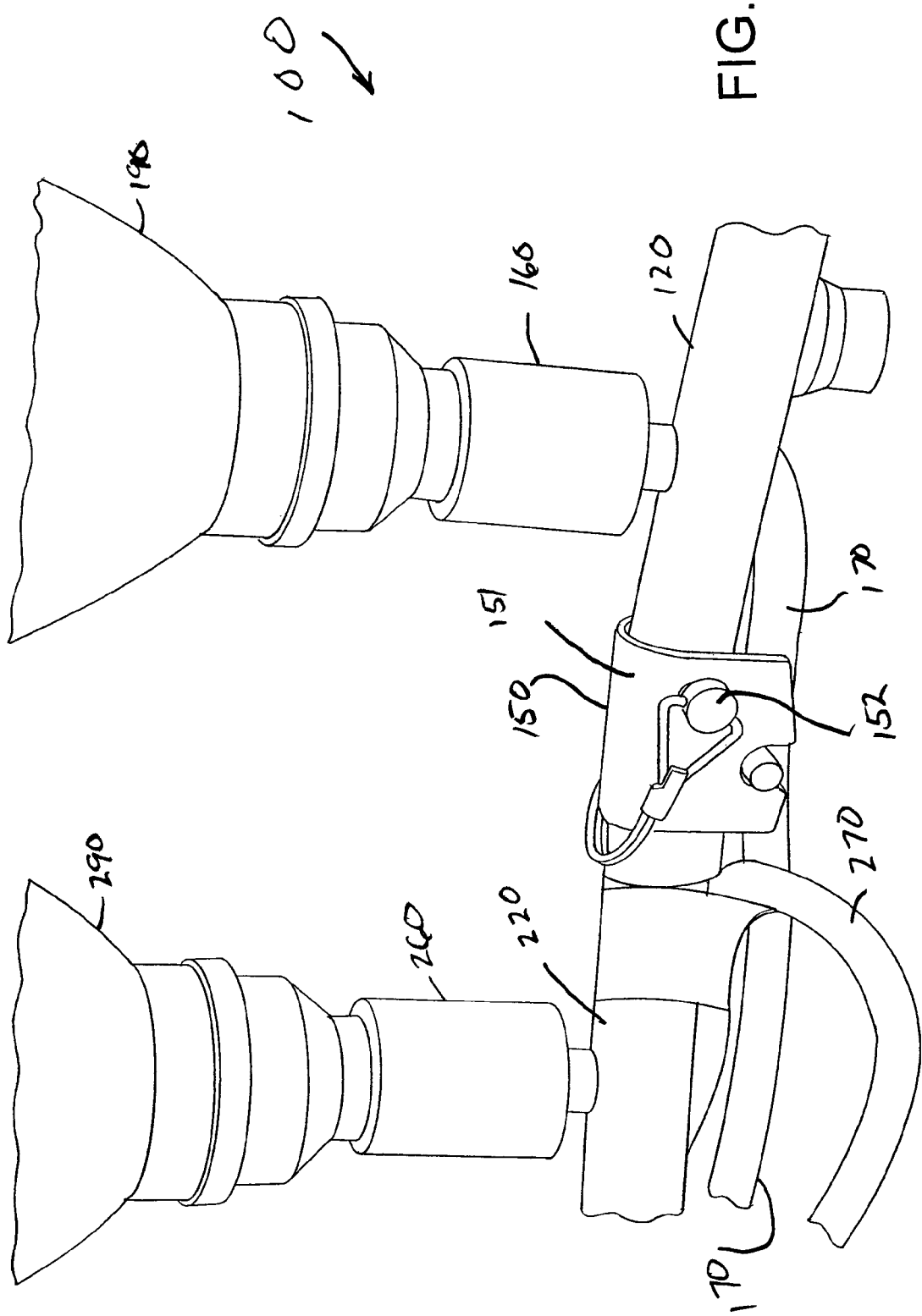
FIG. 5 is a schematic illustration showing a latch for connecting the first and second arcuate tubular members together to form the ring light assembly illustrated in FIG. 1.
Figure 6:
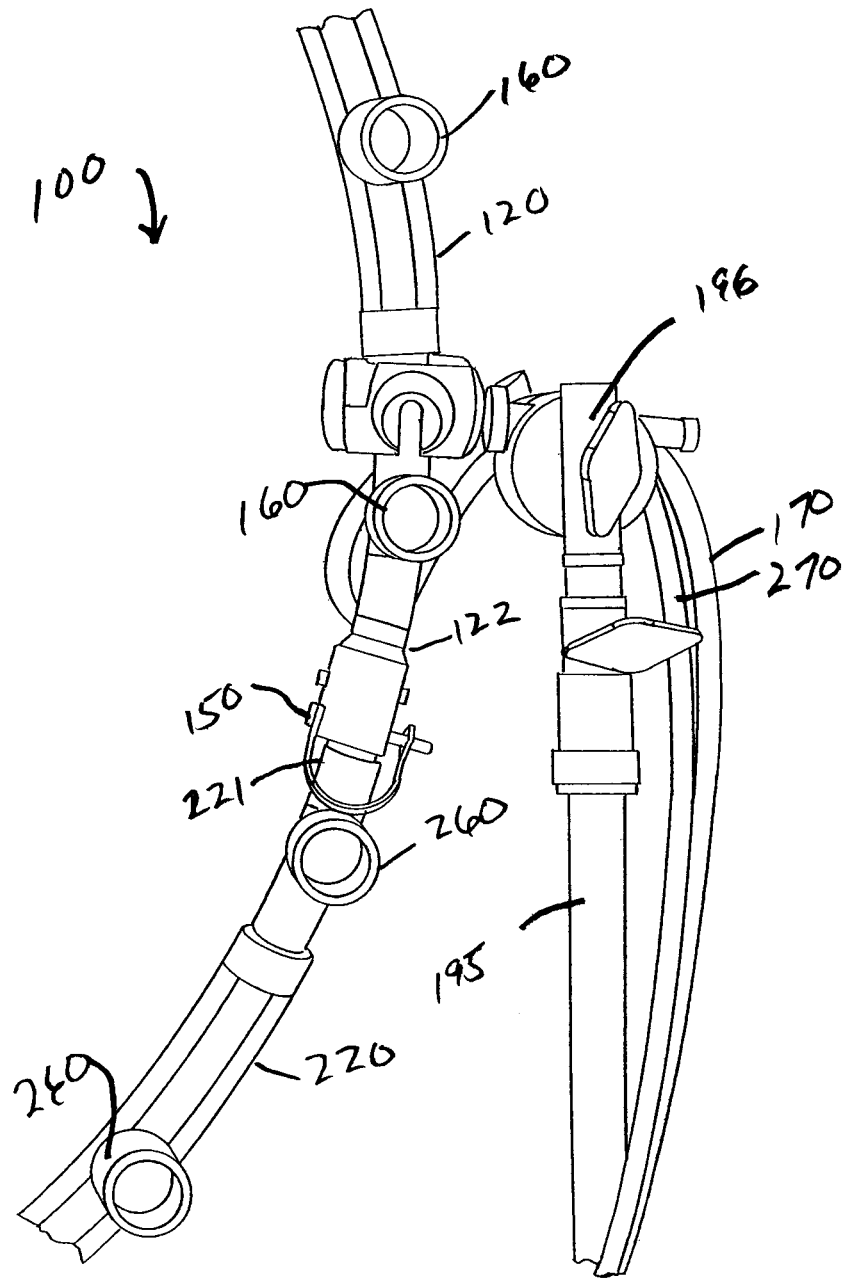
FIG. 6 is a schematic illustration showing attachment of the light assembly illustrated in FIG. 1 to a support stand.

A latch (not shown in the drawings) may be adapted to connect and disconnect the second end 122 of the first arcuate tubular section 120 to the first end 131 of the second arcuate tubular section 130 when the first arcuate tubular member 110 is disconnected from the second arcuate tubular member 210 and folded on itself to form an eye-shaped ring light assembly 100A (FIGS. 3 and 4). The second arcuate tubular member can be similarly folded on itself to form an eye-shaped ring light assembly.

The first arcuate tubular section 120 and the second arcuate tubular section 130, as well as the third arcuate tubular section 220 and the fourth arcuate tubular section 230 may have cross-sections in the form of a circle, square, rectangle or polygon, preferably in the form of a circle. These tubular sections may have outside diameters (or widths) in the range from about 0.5 inch to about 2 inches, or from about 0.75 inch to about 1.5 inches. Each of the arcuate tubular sections 120, 130, 220 and 230 may have a radius of at least about 12 inches, or at least about 14 inches, or at least about 15 inches, or at least about 16 inches, or at least about 17 inches, or at least about 17.5 inches, or at least about 18 inches, or at least about 20 inches, or at least about 22 inches, or at least about 24 inches, or at least about 25 inches.

The first arcuate tubular member 110 and the second arcuate tubular member 210 may each comprise half-circle light assemblies which can be attached to each other with latches 150 and 250. The latch 150 may comprise a lock pin 152 and locking hinge 151. The latch 250 may have a similar construction. The first arcuate tubular member 110 and the second arcuate tubular member 210 include hinges 140 and 240, respectively, which allow the arcuate tubular members 110 and 210 to fold onto themselves for storage and transport, or for use as eye-shaped ring lights. See, FIGS. 3 and 4. Each arcuate tubular member 110 and 210 may be independently wired and grounded to allow each to function on its own. Each arcuate tubular member 110 and 210 may have any desired watt power handling capacity, for example, up to about 2000 watts at 120 volts alternating current (a.c.).

The electric lines 170 and 270 may have a wire guage of any desired size, for example, the lines may be 12 awg stranded two wire lines. The wire gauge to ground may be 12 awg stranded. The wire gauge from socket to harness may be 14 awg stranded. The socket wattage rating may be about 600 watts, 120 volts a.c. The total number of sockets 160 and 260 may range from about 4 to about 30, or from about 6 to about 24, or from about 8 to about 20. The total number of sockets for each of the first and second arcuate members 110 and 210 may be about 9, with a total number for the ring light assembly 100 being about 18.

The arcuate tubular sections 120, 130, 220 and 230, as well as the hinges 140 and 240, and latches 150 and 250, may be constructed of any material that provides desirable properties of strength and light weight. These materials may include steel (carbon steel, stainless steel), aluminum, and the like. The arcuate sections 120, 130, 220 and 230 may have internal passageways of sufficient dimensions to allow for containment within the arcuate section of electrical lines 170 and 270. The internal passageways may have a cross-section (e.g., diameter or width) in the range from about 0.375 inch to about 2 inches, or from about 0.5 inch to about 1.5 inches, or from about 0.5 inch to about 1 inch.

The ring light assembly 100 may have a diameter of at least about 24 inches, or at least about 28 inches, or at least about 30 inches, or at least about 32 inches, or at least about 34 inches, or at least about 35 inches, or at least about 36 inches, or at least about 40 inches, or at least about 44 inches, or at least about 48 inches, or at least about 50 inches.

The light sockets 160 and 260 may be of conventional design. The light sockets 160 and 260 may be conventional screw-in sockets with diameters in the range from about 5 to about 40 millimeters (mm), or about 27 mm. These may include the following standard sockets:

| Designation | Base diameter (thread external) | Name | IEC 60061-1 standard sheet |
|---|---|---|---|
| E5 | 5 mm | Lilliput Edison Screw (LES) | 7004-25 |
| E10 | 10 mm | Miniature Edison Screw (MES) | 7004-22 |
| E11 | 11 mm | Mini-Candelabra Edison Screw (mini-can) | (7004-6-1) |
| E12 | 12 mm | Candelabra Edison Screw (CES) | 7004-28 |
| E14 | 14 mm | Small Edison Screw (SES) | 7004-23 |
| E17 | 17 mm | Intermediate Edison Screw (IES) | 7004-26 |
| E26 | 26 mm | [Medium] (one-inch) Edison Screw (ES or MES) | 7004-21A-2 |
| E27 | 27 mm | [Medium] Edison Screw (ES) | 7004-21 |
| E29 | 29 mm | [Admedium] Edison Screw (ES) | |
| E39 | 39 mm | Single-contact (Mogul- in America) Goliath Edison Screw (GES) | 7004-24-A1 |
| E40 | 40 mm | (Mogul) Goliath Edison Screw (GES) | 7004-24 |

The sockets 160 and 260 may be ceramic sockets covered with a rubber coating, e.g., a rubber tape, to protect the sockets against chipping.

The bulbs 190 and 290 may be of any conventional design depending on the lighting effect that is desired with the light assembly 100. The bulbs that may be used may include incandescent bulbs, fluorescent bulbs, high pressure sodium bulbs, metal halide bulbs, mercury vapor bulbs, low-pressure sodium bulbs, light emitting diodes (LEDs), and the like.

The ring light assembly 100 may combine high power levels, (e.g., 4000 watts total power handling capacity), with a compact and versatile design. The light sockets and bulbs used with the assembly may be conventional and readily available.

The bulbs may be changed from one to another depending on the desired effect to be provided by the ring light assembly.

At 4000 watts total power handling capability, the ring light assembly 100 may be used where high overall light levels of light are needed or in high contrast situations, for example when competing with bright daylight outdoors, or looking at bright windows when indoors. The high lumen output that may be provided may be especially useful when diffusing the light through heavy diffusion materials such as grid cloth or muslin.

The ring light assembly 100 may have a compact and versatile form that allows for it to be used not only as a large ring light, but in many other ways. The collapsible facilitated frame allows for facilitated transport and storage.

The ring light assembly 100, with its relatively large diameter of at least about 24 inches, or from about 24 to about 50 inches, allows for the camera to see more of the subject in the frame lit by the ring light. The camera may be pulled back and used with a longer focal length lens to both compress the background and provide focus fall off with more pleasing bokeh. A longer focal length portrait lens may be more pleasing to the subject being photographed. The subject being photographed may have more freedom of movement while in the light, for example, while the person being photographed is dancing.

The ring light assembly 100 may provide a soft source of light for a key, fill, or backlight from any angle. The ring light assembly 100 may be used to evenly fill a 4×4 foot diffusion frame, which is an industry standard, from a one foot distance with tungsten, daylight, or any other color temperature in between. The ring light assembly 100 may be dimmed from top to bottom to naturally grade the light in the diffusion frame and emphasize the face or focal point of the person or object being photographed. This may eliminate the need for further cutting with flags or nets.

The bulbs 190 and 290 that may be used may be of any type. These may include higher cri LED bulbs and compact fluorescents. Different sets of bulbs for different jobs and uses may be employed. Socket dimmers, multi socket adapters, or socket swivels may be added.

The ring light assembly 100 may be used to provide two independent eye shaped ring lights, each with its own power handling capability. See, FIGS. 3 and 4.

The ring light assembly 100 may function as an overhead fixture with a slim profile. It can be used as a chicken coop style fixture with a skirt, a space light, a pancake lantern, or a chandelier type of fixture depending on the bulbs or diffusion.

The ring light assembly 100 may be used on the ground to provide an effective fire gag, especially with a flicker-box.

The ring light assembly 100 may be lamped with more specular mr16 style bulbs to provide a soft but sparkling and intense light output. This may be used to provide new life to faceted shiny objects such as jewelry.

The ring light assembly 100 may be used to push through umbrellas and any round diffusion, which may be useful for round catch lights in a model's eyes.

At the end of the shoot the ring light assembly 100 may be folded and stored in a relatively small vehicle. It may be transported on an airplane and stored overhead. If the operator cannot travel with the bulbs, they can be acquired in virtually any city, or any country, with only a simple plug adapter. There may be no electronics that require switching the fixture plugs.

While the invention has been explained in relation to various embodiments, it is to be understood that various modifications thereof will become apparent to those skilled in the art upon reading the specification. Therefore, it is to be understood that the invention disclosed herein is intended to cover such modifications as fall within the scope of the appended claims.

The invention claimed is:

1. A ring light assembly, comprising:
    a first arcuate member and a second arcuate member, the first arcuate member being attached to the second arcuate member to form a circle with a center opening;
    the first arcuate member comprising a first arcuate section and a second arcuate section, the first arcuate section having a first end and a second end, the second arcuate section having a first end and a second end, the first end of the first arcuate section being connected to the second end of the second arcuate section; a plurality of first light sockets attached to the first arcuate member;
    the second arcuate member comprising a third arcuate section and a fourth arcuate section, the third arcuate section having a first end and a second end, the fourth arcuate section having a first end and a second end; the first end of the fourth arcuate section being connected to the second end of the third arcuate section; a plurality of second light sockets attached to the second arcuate member;
    an electric line adapted to connect the plurality of first and second light sockets to a power source;
    the second end of the first arcuate section being connected to the first end of the third arcuate section by a first latch;
    the first end of the second arcuate section being connected to the second end of the fourth arcuate section by a second latch;
    each of the first, second, third and fourth arcuate sections having a radius of at least about 12 inches, the diameter of the ring light assembly being at least about 24 inches;
    wherein the first, second, third and fourth arcuate sections are aligned in sequence to form the circle, and the first light sockets and the second light sockets are positioned on the exterior of the first and second arcuate members, wherein each light socket comprises a screw-in socket and a bulb inserted in each light socket, the bulbs being oriented in the same direction and at a right angle relative to the first and second arcuate members to focus light on a subject removed from the ring light assembly, the ring light assembly being useable with a camera shooting through the center of the ring light assembly to erase shadows from a subject being photographed.

2. The assembly of claim 1 wherein each of the first, second, third and fourth arcuate sections has a cross-section in the form of a circle, square, rectangle or polygon.

3. The assembly of claim 1 wherein each of the first, second, third and fourth arcuate sections has a cross-section in the form of a circle.

4. The assembly of claim 1 wherein the first and second arcuate members can be detached from each other and folded to form eye-shaped rings.

5. The assembly of claim 1 wherein the ring light assembly is in the form of a circle and has a diameter in the range from about 24 to about 50 inches.

6. The assembly of claim 5 wherein the diameter is in the range from about 32 to about 40 inches.

7. The assembly of claim 1 wherein each screw-in socket has a base diameter in the range from about 5 to about 40 millimeters.

8. The assembly of claim 1 wherein each screw-in socket has a base diameter of about 27 millimeters.

9. The assembly of claim 1 wherein each bulb comprises an incandescent bulb, fluorescent bulb, halogen bulb, high pressure sodium bulb, metal halide bulb, mercury vapor bulb, low-pressure sodium bulb, or light emitting diode.

10. The assembly of claim 1 wherein the ring light assembly comprises from about 4 to about 30 light sockets.

11. The assembly of claim 1 wherein the ring light assembly comprises from about 8 to about 20 light sockets.

* * * * *